Patented Oct. 7, 1941

2,257,817

UNITED STATES PATENT OFFICE 2,257,817

HYDROXYALKYLATION OF AMINES

George W. Seymour and Victor Sluyty Salvin, Cumberland, Md., assignors to Celanese Corporation of America, a corporation of Delaware No Drawing. Application March 16, 1939,
Serial No. 262,178

1 Claim. (Cl. 260—562)

This invention relates to the preparation of hydroxyalkyl amines and relates more particularly to the preparation of the same by reacting amines with alkylene oxides.

An object of our invention is to provide a method of hydroxyalkylating amines by means of alkylene oxides which is simpler and capable of more definite control than are the methods heretofore employed. Other objects of our invention will appear from the following detailed description.

It is known that hydroxyethyl amines may be formed by the reaction of an amine with an ethylene oxide. However, this process is open to many objections, in that excessive quantities of ethylene oxide and/or excessively high temperatures and pressures must be employed and even under these conditions complete reaction is not always obtained and the chemical nature of the resulting product cannot be controlled definitely.

We have found that if amines are reacted with alkylene oxide in the presence of acidic catalysts, many advantageous results are obtained, among which are the following. The amount of alkylene oxide required for the reaction is reduced. Considerably lower temperatures and/or pressures are required for the reaction. The nature of the product can be controlled, i. e. the number of hydroxyalkyl groups introduced or the formation of poly-alkylene oxide-hydroxy-amino groups may be more definitely controlled. This latter feature is of importance in the making of dyestuffs, since usually dyestuffs containing the mono-hydroxy-ethyl amino groups are not fast to the action of combustion gases in the atmosphere, and some of these groups are formed by the old methods.

While this invention is applicable to the hydroxyalkylation of amines in general, it is of particular importance in connection with the reaction of alkylene oxides with aromatic amines which may be simple amines such as aniline, phenylene diamines, toluidine, etc. However, the invention is particularly applicable to the hydroxyalkylation of amines which are considered difficult to substitute as, for instance, nitro-amino anisoles, dinitro-anilines, α-naphthyl-amines and amino-anthraquinones.

While we prefer to employ ethylene oxide as the hydroxyalkylating agent, other alkylene oxides, such as propylene oxide or butylene oxide, may be employed. The amount used will vary with the degree of hydroxyalkylation desired, but an advantage of my process is that the amount of alkylene oxide employed in excess of the theoretical amount required to obtain the desired product is greatly reduced, and may be from 3 to 7 molecular proportions for each amino group in the amine to be hydroxylated.

Any acidic catalyst may be employed, but I prefer to use mineral acids, such as hydrochloric acid, sulphuric acid or phosphoric acid, or acidic salts such as zinc chloride, aluminum chloride, magnesium chloride, etc.

The amount of acid catalyst may be in the case of mineral acids, from 50% of up to the amount required to form the salt of the amine being treated, or it may be from 0 to 200% in excess of that amount. In the case of acid salts the amount used may be $\frac{1}{10}$ to 1 molecular proportion.

Preferably the alkylation is carried out at superatmospheric pressures of 0 to 150 lbs. per square inch and at temperatures of 50 to 200° C. The particular temperatures and pressures employed will vary with the particular amine and/or alkylene oxide employed. However, a particular advantage of this process is that it permits the employment of lower temperatures and pressures than those required by the prior process to produce a given result.

In some cases, it is advantageous to carry out the reaction in the presence of a solvent, such as acetone or methanol, to expedite the reaction and facilitate subsequent handling. If the hydroxylated amine formed is to be used for further reaction, such as for coupling with a diazo compound, it is not necessary to isolate it from the reaction mass.

In order further to illustrate our invention, but without being limited thereto, the following specific examples are given:

Example I 2-amino-4-acetylamino-anisole is treated with hydrochloric acid to form the hydrochloride. 10 kilograms of the 2-amino-hydrochloride-4-acetylamino-anisole, 19 liters of ethylene oxide and 20 liters of methanol are charged into a pressure bomb and heated for 2 hours at 160° C. at 150 pounds pressure. The resulting products, 2-N-bis-ω-hydroxyethyl-4-acetylamine-anisole may be used as an intermediate to form dyestuffs which are resistant to the fading action of air containing gases of combustion. Thus it may be coupled with diazotized 6-chlor-2,4-dinitro-aniline to form a dye capable of dyeing cellulose acetate material a good greenish blue that is resistant to acid fading, i. e. the dyed fabric shows no color change when subjected to mild concentrations of nitrous acid or to exposure to 48 hours in a cabinet in which a gas flame burns. The dyed fabric does not suffer a color change when subjected to acid or alkali.

Example II

One molecular proportion of 2-methoxy-4-amino-acetanilide is reacted with 1 molecular proportion of hydrochloric acid and 3 molecular proportions (i. e. one molecular proportion in excess of that theoretically required) of ethylene oxide at a temperature of 70° to 85° C. and at pressures of 50 to 100 lbs. per square inch. After 4 to 8 hours treatment, good yields of 2-methoxy-4-N-bis-ω-hydroxyethyl acetanilide are produced. If the hydrochloric acid were omitted, the amount of ethylene oxide required would be 4–5 molecular proportions in excess of theoretical, and the required temperatures and pressures would be 160° C. and 150 lbs. per square inch in order to obtain the same results.

It is to be understood that the foregoing detailed description is merely given by way of illustration and that many variations may be made therein without departing from the spirit of our invention.

Having described our invention, what we desire to secure by Letters Patent is:

Method of producing hydroxyethyl amines, which comprises reacting the hydrochloric acid sale of 2-amino-4-acetylamino-anisole with ethylene oxide in the presence of methyl alcohol as solvent for the hydroxyethyl amine produced.

GEORGE W. SEYMOUR.
VICTOR SLUYTY SALVIN.

CERTIFICATE OF CORRECTION.

Patent No. 2,257,817. October 7, 1941.

GEORGE W. SEYMOUR, ET AL.

It is hereby certified that error appears in the printed specification of the above numbered patent requiring correction as follows: Page 2, second column, line 13, in the claim, for the word "sale" read --salt--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.